United States Patent
Spector (10) Patent No.: US 11,507,954 B2
(45) Date of Patent: Nov. 22, 2022

(54) SYSTEMS AND METHODS FOR CONDUCTING TRANSACTIONS USING A SURROGATE PIN

(71) Applicant: JPMorgan Chase Bank, N.A., New York, NY (US)

(72) Inventor: Howard Spector, Woolwich, NJ (US)

(73) Assignee: JPMORGAN CHASE BANK, N.A., New York, NY (US)

(*) Notice: Subject to any disclaimer, the term of this patent is extended or adjusted under 35 U.S.C. 154(b) by 413 days.

(21) Appl. No.: 15/957,331

(22) Filed: Apr. 19, 2018

(65) Prior Publication Data

US 2018/0308096 A1 Oct. 25, 2018

Related U.S. Application Data

(60) Provisional application No. 62/487,025, filed on Apr. 19, 2017.

(51) Int. Cl.
*G06Q 20/40* (2012.01)
*G06Q 20/38* (2012.01)
*G06Q 20/36* (2012.01)
*G06Q 20/26* (2012.01)

(52) U.S. Cl.
CPC ......... *G06Q 20/4012* (2013.01); *G06Q 20/26* (2013.01); *G06Q 20/36* (2013.01); *G06Q 20/385* (2013.01)

(58) Field of Classification Search
None
See application file for complete search history.

(56) References Cited

U.S. PATENT DOCUMENTS

| | | | | |
|---|---|---|---|---|
| 9,195,984 B1* | 11/2015 | Spector | ............... | G06Q 20/367 |
| 2013/0041830 A1* | 2/2013 | Singh | ............... | G06Q 20/38215 |
| | | | | 705/65 |
| 2013/0110658 A1 | 5/2013 | Lyman et al. | | |
| 2016/0048834 A1* | 2/2016 | Kurian | ................. | G06Q 20/401 |
| | | | | 705/44 |
| 2016/0371668 A1* | 12/2016 | Priebatsch | ........... | G06Q 20/348 |
| 2017/0262849 A1 | 9/2017 | Hammad et al. | | |

(Continued)

OTHER PUBLICATIONS

U.S. Appl. No. 14/699,511, filed Apr. 2015, DeVan et al.

(Continued)

*Primary Examiner* — Neha Patel
*Assistant Examiner* — Nicholas K Phan
(74) *Attorney, Agent, or Firm* — Greenberg Traurig LLP (57) ABSTRACT

System and methods for conducting transactions using a surrogate PIN are disclosed. In one embodiment, at a mobile payment platform comprising at least one computer processor, a method for conducting a transaction may include: (1) receiving an identification of a debit-based payment instrument from an electronic wallet; (2) receiving, from a payment switch, a token for the debit-based payment instrument and a limited use key; (3) associating the token and limited use key with the debit-based payment instrument; and (4) providing the token and limited use key to a digital payment platform for transacting. A surrogate PIN may be provided to a debit payment network from one of the payment switch and a digital payment platform for an issuer.

9 Claims, 4 Drawing Sheets

(56) References Cited

U.S. PATENT DOCUMENTS

2017/0262850 A1      9/2017   Hammad et al.

OTHER PUBLICATIONS

U.S. Appl. No. 15/069,458, filed Mar. 2016, Hammad et al.
U.S. Appl. No. 15/088,437, filed Apr. 2016, Hammad et al.
U.S. Appl. No. 15/131,979, filed Apr. 2016, Spector et al.
U.S. Appl. No. 15/158,720, filed May 2016, Spector.
U.S. Appl. No. 15/345,942, filed Nov. 2016, Sokol et al.
International Searching Authority, PCT International Search Report and Written Opinion, International Application No. PCT/US18/28317, dated Jul. 10, 2018, pp. 1-9.
European Search Report, dated Mar. 26, 2021, from corresponding European Patent Application No. 18787954.9.

\* cited by examiner

SYSTEMS AND METHODS FOR CONDUCTING TRANSACTIONS USING A SURROGATE PIN

RELATED APPLICATIONS

This application is claims priority to U.S. Provisional Patent Application Ser. No. 62/487,025, filed Apr. 19, 2017, and is related to U.S. Provisional Patent Application Ser. No. 62/465,683, filed Mar. 1, 2017, and U.S. Provisional Patent Application Ser. No. 62/469,135, filed Mar. 9, 2017. The disclosures of each of these applications are hereby incorporated, by reference, in their entireties.

BACKGROUND OF THE INVENTION

1. Field of the Invention

The present disclosure generally relates to systems and methods for conducting transactions using a surrogate PIN.

2. Description of the Related Art

Transactions using a debit instrument, such as a debit card, often require a personal identification number, or PIN, to be processed. With an electronic wallet-based transaction, a PIN may not be included. If PIN is not provided, the transaction may be rejected, or may fail.

SUMMARY OF THE INVENTION

System and methods for conducting transactions using a surrogate PIN are disclosed. In one embodiment, at a mobile payment platform comprising at least one computer processor, a method for conducting a transaction may include: (1) receiving an identification of a debit-based payment instrument from an electronic wallet; (2) receiving, from a payment switch, a token for the debit-based payment instrument and a limited use key; (3) associating the token and limited use key with the debit-based payment instrument; and (4) providing the token and limited use key to a digital payment platform for transacting. A surrogate PIN may be provided to a debit payment network from one of the payment switch and a digital payment platform for an issuer.

In one embodiment, the surrogate PIN may be based at least in part on the limited use key.

In one embodiment, the payment switch may be part of a payment ecosystem.

In one embodiment, the surrogate PIN may be generated by at least one of the payment network switch and the digital payment platform.

In one embodiment, the electronic wallet may be executed by a mobile electronic device, online, or interacted with via a SDK or an API.

According to another embodiment, a method for routing a transaction may include: (1) receiving, from a merchant, a transaction comprising a payment token for a debit-based payment instrument and a surrogate PIN, wherein the surrogate PIN is received from one of a payment switch and a digital payment platform for an issuer of the debit-based payment instrument; (2) retrieving an account number associated with the payment token; and (3) routing the transaction as a PIN-based debit transaction using the surrogate PIN. The merchant may conduct the transaction as a PIN-based transaction by submitting the transaction directly to an issuer or over an existing PIN debit network.

In one embodiment, the payment token and the surrogate PIN may be received in a machine-readable code.

In one embodiment, the machine-readable code may be a RF transmission, NFC, a QR code, etc.

In one embodiment, the surrogate PIN may be generated by one of the payment switch and the digital payment platform.

In one embodiment, the payment token and the surrogate PIN may be received from an electronic wallet executed by a mobile electronic device. The electronic wallet may generate the surrogate PIN locally on the device, or may use an API or SDK to retrieve the information from the token provider's system.

According to another embodiment, a method for conducting a transaction may include: (1) receiving, from a merchant, a transaction comprising a payment token for a stored value payment instrument; (2) executing a funding transaction to fund the stored value payment instrument for the transaction; and (3) conducting the stored value payment instrument for the transaction.

In one embodiment, the funding transaction may be an open-loop transaction. In another embodiment, the funding transaction may be a closed-loop transaction.

In one embodiment, the funding transaction may be executed by a payment switch.

In one embodiment, the funding transaction may be conducted for the amount of the transaction.

In one embodiment, the method may further include receiving a surrogate PIN for the stored value instrument. The transaction may be conducted using the surrogate PIN.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for conducting transactions using a surrogate PIN are disclosed.

Under U.S. regulations, merchants may route wallet-based PIN debit transactions over debit payment networks (i.e., closed loop payment networks) or credit payment networks (e.g., open loop payment networks). In embodiments, a backend may generate a surrogate PIN block that may be based on the customer's authentication to a mobile electronic wallet, and may use that to create a PIN-based transaction that uses the debit payment network rather than the credit payment network. For example, the surrogate PIN block may include session identification information, etc. from the user's payment application session. For increased security, the surrogate PIN block may be different for each session, for each transaction, for each merchant, etc.

Notably, the surrogate PIN is not entered by the user, but is instead provided by the mobile electronic wallet.

Figure 1A:
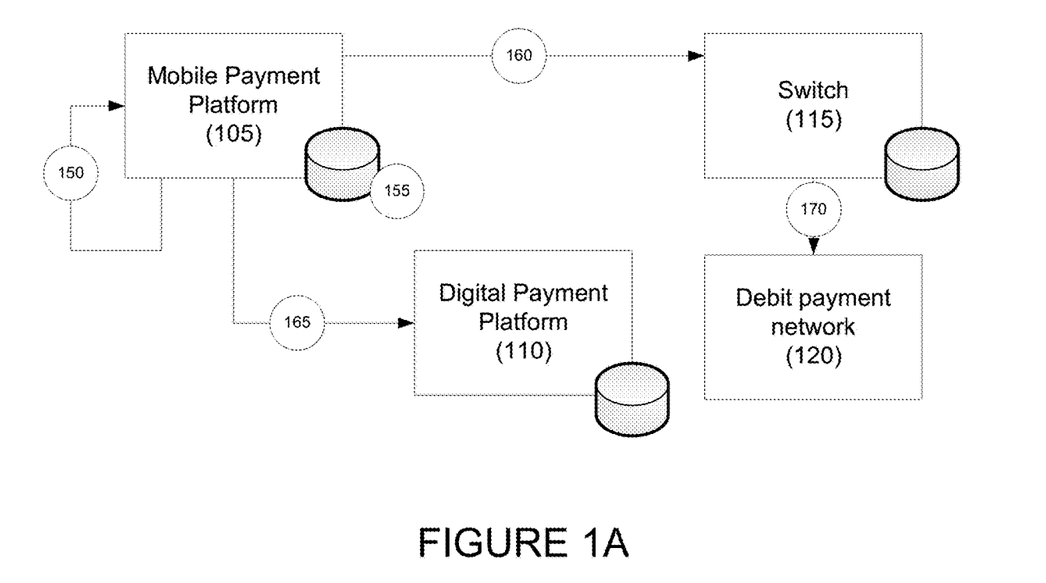
FIG. 1A depicts a system for provisioning a debit card for use with a surrogate PIN to one embodiment.
Figure 1B:
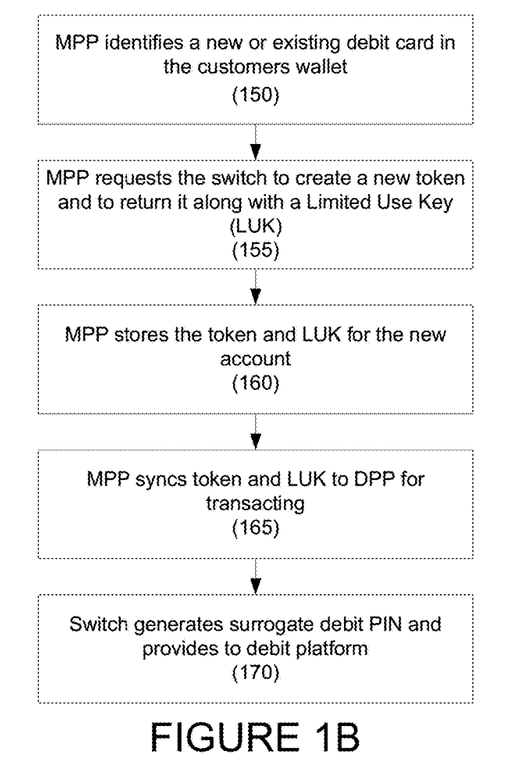
FIG. 1B depicts an exemplary method for provisioning a debit card for use with a surrogate PIN using the system of FIG. 1A according to one embodiment.

FIG. 1A depicts a system for provisioning a debit card for use with a surrogate PIN according to one embodiment, and FIG. 1B depicts an exemplary method for provisioning a debit card for use with a surrogate PIN with the system of FIG. 1A.

System 100 may include a mobile payment platform, which may be an electronic wallet or mobile payment application executed by an electronic device, such as a smartphone, a smartwatch, a tablet computer, a notebook computer, a desktop computer, an Internet of Things (IoT) appliance, etc. An example of a mobile payment platform is ChasePay.

System 110 may further include digital payment platform 110. Digital payment platform 110 may be a backend for mobile payment platform 105. In one embodiment, mobile payment platform may be hosted by, or executed by, a financial institution.

Payment switch 115 may be provided and executed by an acquirer (not shown) or a payment network (not shown). In one embodiment, payment switch 115 may be located between the acquirer (not shown) and the issuer (not shown). In one embodiment, payment switch 115 may function to de-tokenize, validate the cryptogram, and route traffic. For example, payment switch 115 may route a transaction to either debit payment network 120 (e.g., a closed loop payment network), a credit payment network (not shown) (e.g., an open look payment network), or both. In one embodiment, payment switch 115 may manage, troubleshoot, and repair transaction failures.

Examples of debit payment networks include debit transactions, gift card transactions, etc.

In order to provisional a debit card for use, in step 150, the mobile payment platform (MPP) may identify a new or existing debit card in the customer's wallet.

In step 155, the MPP may request the payment switch to create a new token and to return it to the MPP along with one or more Limited Use Key (LUK).

In step 160, the MPP may store the token and LUK for the new or existing debit card. In one embodiment, the token and LUK may be stored in a secure storage area (e.g., a secure element), in the cloud, etc.

In step 165, the MPP may synchronize the token and LUK with digital payment platform (DPP) for future transactions.

In step 170, the payment switch may generate a surrogate PIN, and may provide the surrogate PIN to the debit payment network. In one embodiment, the payment switch may generate the surrogate PIN using, for example, the LUK, the token, etc.

In one embodiment, the surrogate PIN may be unique for each transaction and/or each merchant. In one embodiment, the uniqueness of the surrogate PIN may be configurable. For example, the surrogate PIN may be permitted to be reused after a certain number of transactions, after the passage of a certain amount of time, etc.

In one embodiment, the surrogate PIN may include four digits and/or characters. Any suitable number of digits and/or characters may be used as is necessary and/or desired.

Any other suitable way of configuring the uniqueness of the surrogate PIN may be used as is necessary and/or desired.

Figure 2A:
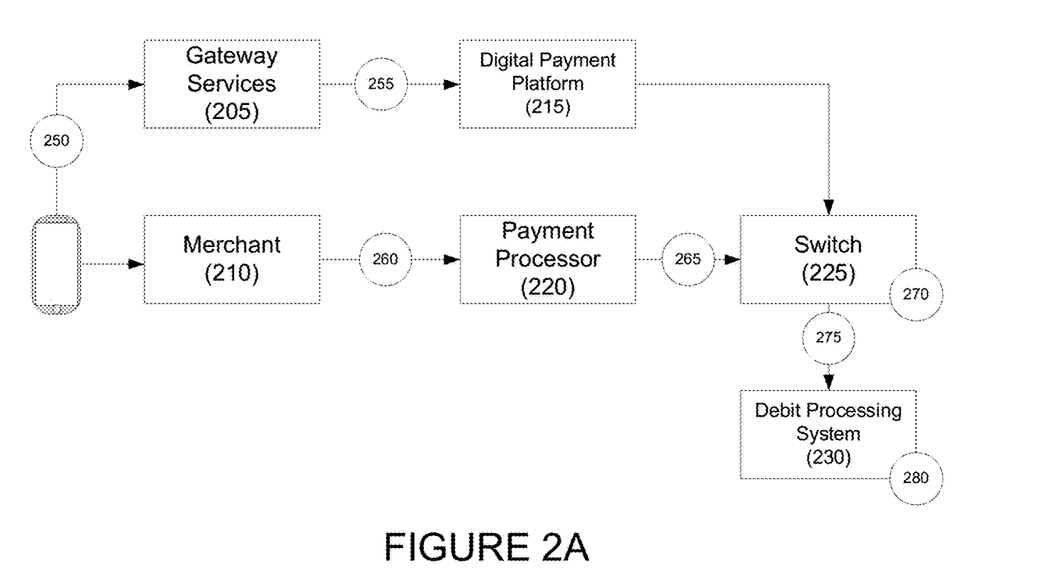
FIG. 2A depicts a system for conducting transactions using a surrogate PIN according to one embodiment.

Referring to FIG. 2A, a system for conducting a transaction with a surrogate PIN is disclosed according to one embodiment. System 200 may include a mobile electronic device (e.g., a smartphone, tablet computer, IoT device, etc.) that may execute a payment application and/or electronic wallet, gateway services 205, digital payment platform 215, merchant 210, payment processor 220, payment switch 225, and debit processing system 230.

In one embodiment, the mobile device may communicate with gateway services 205 for a financial institution, which may then communicate with digital payment platform (DPP) 215 for the financial institution. The mobile device may further communicate with merchant 210 to, for example, make a purchase. Merchant 210 may communicate with payment processor 220 for processing a payment.

In one embodiment, payment processor 220 may be an acquirer.

Payment switch 225 may be similar to payment switch 115, and may route the transaction based on, for example, a transaction rule.

Debit processing system 230 may process the PIN-based transaction.

Figure 2B:
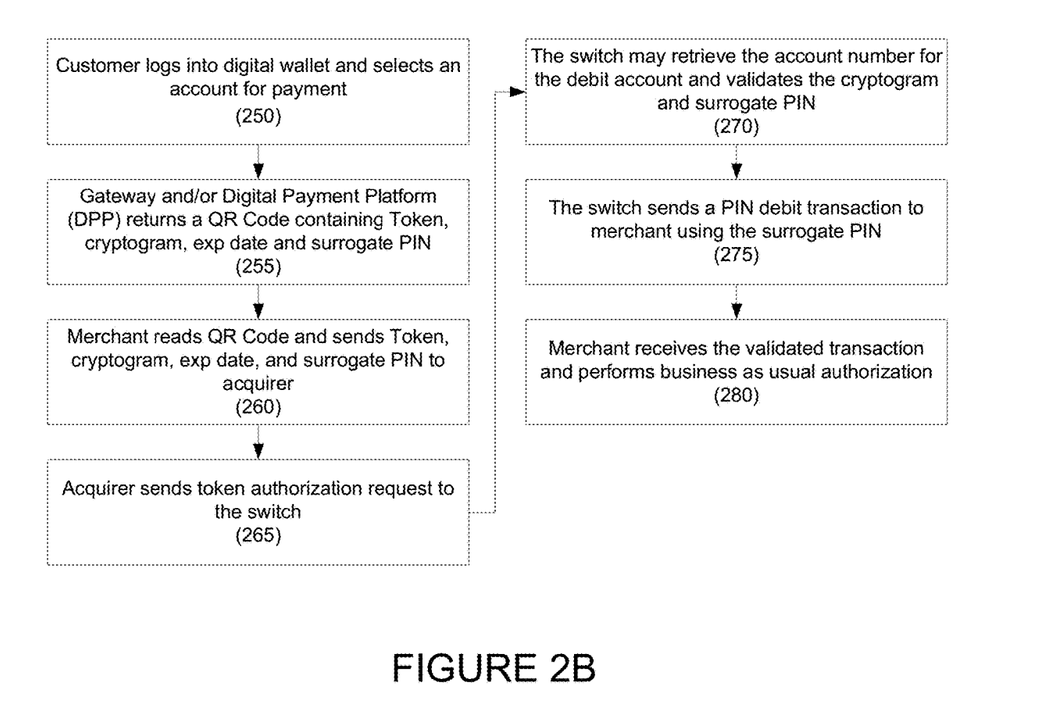
FIG. 2B depicts a method for conducting transactions using a surrogate PIN using the system of FIG. 2A according to one embodiment.

Referring to FIG. 2B, a method for conducting a transaction with a surrogate PIN is disclosed according to one embodiment. In step 250, a customer may log into a mobile electronic wallet and may select the account to use to conduct a transaction.

In step 255, the DPP and/or payment switch may generate and return a machine-readable code, such as a QR code, a NFC transmission, etc. containing, for example, a token, cryptogram, expiration date and, and a surrogate PIN. Other information may be provided as is necessary and/or desired.

In another embodiment, the surrogate PIN may be displayed in a mobile application, a webpage, etc.

In step 260, the merchant may receive the surrogate PIN. The surrogate PIN may be received, for example, in the QR code, NFC transmission, etc. The merchant may communicate the token, cryptogram, expiration date, and surrogate PIN to an acquirer and/or payment processing network.

In step 265, the acquirer and/or payment processing network may communicate a token authorization request to the payment switch.

In step 270, the payment switch may retrieve, for example, the Funding Primary Account Number (FPAN) for the debit account. It may further validate the cryptogram and surrogate PIN.

In step 275, the payment switch may send a PIN debit transaction to the merchant using the surrogate PIN.

In step 280, the merchant may receive the validated transaction and may perform business as usual authentication and conduct the transaction.

Figure 3A:
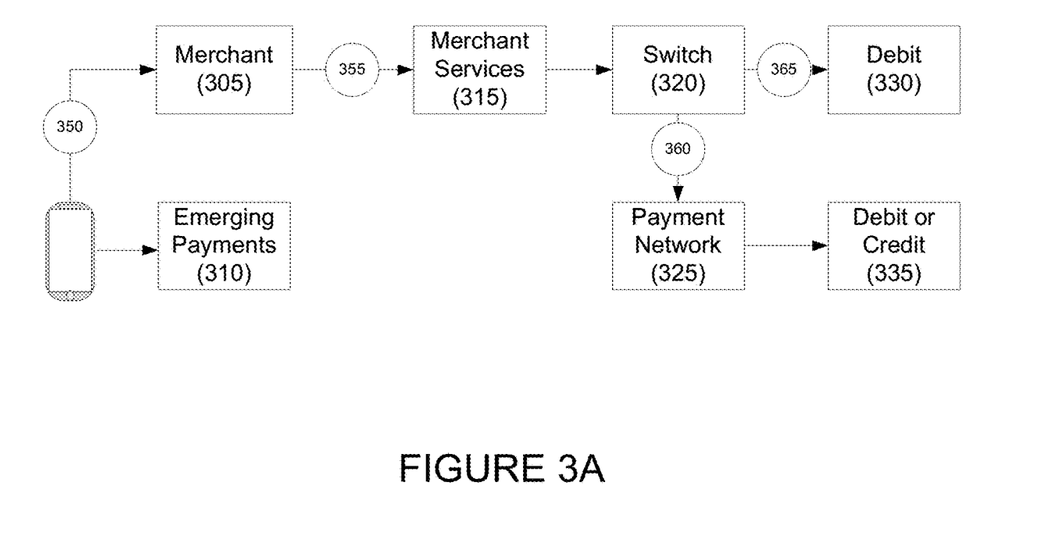
FIG. 3A depicts a system for conducting transactions using a surrogate PIN according to one embodiment.

Referring to FIG. 3A, a system for using a surrogate PIN with a prepaid or stored value instrument is disclosed according to one embodiment. In one embodiment, a token maps to a prepaid card that may be funded by an open network transaction against the customers selected account. In one embodiment, the funding may be made in real-time, such as before the transaction, or it may be funded post-transaction.

System 300 may include a mobile electronic device (e.g., a smartphone, tablet computer, IoT device, etc.) that may execute a payment application and/or electronic wallet, merchant 305 and merchant services 315, emerging payments 310, payment switch 320, payment network 325, debit platform 330, and debit or credit platform 335.

Figure 3B:
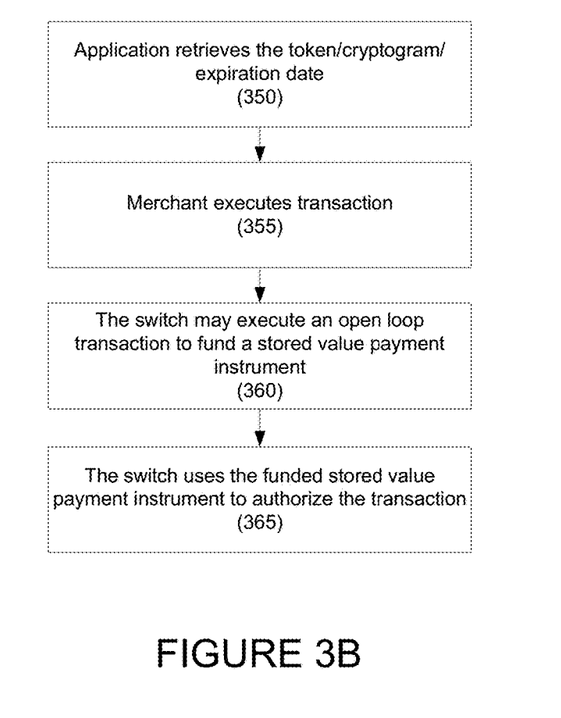
FIG. 3B depicts a method for conducting transactions using a surrogate PIN using the system of FIG. 3A according to one embodiment.

Referring to FIG. 3B, a method for using a surrogate PIN with a prepaid or stored value instrument is disclosed.

In step 350, a mobile wallet may retrieve a token, a cryptogram, and an expiration date for a prepaid financial instrument. In one embodiment, a surrogate PIN may be generated and received as described above. In embodiments, the use of the surrogate PIN may be optional.

In step 355, a merchant may execute the transaction. For example, the merchant may pass the transaction to merchant services, which may then pass the transaction to the payment switch.

In step 360, the payment switch may execute a transaction to fund a stored value payment instrument, such as a prepaid card, for the transaction. In one embodiment, the transaction may be an open-loop transaction that is conducted over a payment network. In another embodiment, the transaction may be a closed-loop transaction.

In step 365, the payment switch may use the funded stored value payment instrument to authorize the transaction. In one embodiment, the optional surrogate PIN may be used. The transaction may be executed using a debit authorization platform.

Figure 4A:
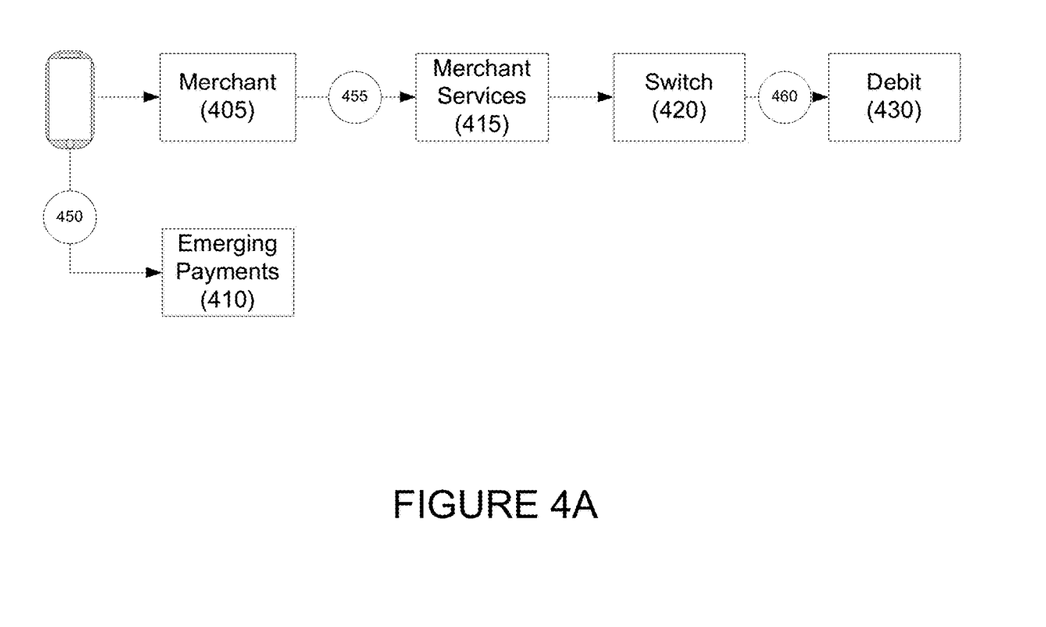
FIG. 4A depicts a system for conducting transactions using a surrogate PIN according to one embodiment.

FIG. 4A depicts a system for conducting a transaction with a surrogate PIN is disclosed according to another embodiment. System 400 may include a mobile electronic device (e.g., a smartphone, tablet computer, IoT device, etc.) that may execute a payment application and/or electronic wallet, merchant 405 and merchant services 415, emerging payments 410, payment switch 420, payment network 325, and debit platform 430.

Figure 4B:
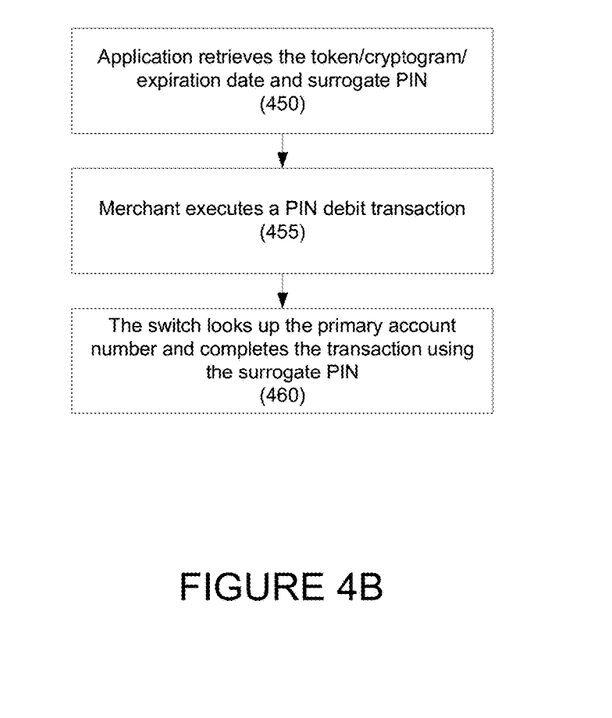
FIG. 4B depicts a method for conducting transactions using a surrogate PIN using the system of FIG. 4A according to one embodiment.

FIG. 4B depicts a method for conducting a transaction with a surrogate PIN is disclosed according to another embodiment. In step 450, a mobile wallet may retrieve a token, a cryptogram, and an expiration date for a prepaid financial instrument. In one embodiment, a surrogate PIN may be generated and received, as described above. In embodiments, the use of the surrogate PIN may be optional.

In step 455, the merchant may execute a PIN debit transaction, and, in step 460, the payment switch may retrieve the Primary Account Number (PAN) for the debit account. It may then conduct the transaction using the surrogate PIN.

The following documents are hereby incorporated, by reference, in their entireties: U.S. patent application Ser. No. 15/362,019; U.S. patent application Ser. No. 15/069,418; U.S. patent application Ser. No. 14/699,511, U.S. Provisional Patent Application Ser. No. 62/148,493; U.S. Provisional Patent Application Ser. No. 62/107,800; U.S. Provisional Patent Application Ser. No. 62/037,891; U.S. patent application Ser. No. 15/069,418; U.S. patent application Ser. No. 15/069,458; U.S. patent application Ser. No. 15/088,437; U.S. patent application Ser. No. 15/158,720; U.S. patent application Ser. No. 15/345,942; U.S. Patent Application Ser. No. 62/331,564; U.S. patent application Ser. No. 15/131,979; and U.S. Patent Application Ser. No. 62/312,204.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory.

The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories.

However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for conducting a transaction, comprising:
   identifying, by a mobile payment platform, a debit-based payment instrument in an electronic wallet;
   requesting, by the mobile payment platform, a payment token for the debit- based payment instrument from a third-party payment switch;
   receiving, from the third-party payment switch executed by a debit payment network, the payment token for the debit-based payment instrument and a limited use key
   generating, by the third-party payment switch, a surrogate PIN for the payment token using the limited use key and the payment token; and
   providing, by the third-party payment switch, a PIN debit transaction comprising the payment token and the surrogate PIN to a merchant backend, wherein the merchant backend conducts the PIN debit transaction on a debit payment network using the payment token and the surrogate PIN.

2. The method of claim 1, wherein the debit payment network is an open-loop network.

3. The method of claim 1, wherein the debit payment network is a closed-loop payment network.

4. The method of claim 1, wherein the electronic wallet is executed by a mobile electronic device.

5. A method for routing a transaction, comprising:
   generating, by a third-party payment switch, a surrogate PIN for a payment token using a limited use key and the payment token;
   providing, by the third-party payment switch, the surrogate PIN to an electronic wallet;
   receiving, by the third-party payment switch and from a merchant, a transaction comprising the payment token and the surrogate PIN;
   retrieving, by the third-party payment switch, an account number associated with the payment token; and
   routing, by the third-party payment switch, the transaction as a PIN debit transaction with the account number and the surrogate PIN to the merchant;
   wherein the merchant is configured to conduct the PIN debit transaction over a debit payment network.

6. The method of claim 5, wherein the payment token and the surrogate PIN are received in a machine-readable code.

7. The method of claim 6, wherein the machine-readable code comprises a NFC transmission.

8. The method of claim 6, wherein the machine-readable code comprises a QR code.

9. The method of claim 5, wherein the payment token and the surrogate PIN are received from an electronic wallet executed by a mobile electronic device.

* * * * *